United States Patent [19]

Suderman

[11] 4,393,791

[45] Jul. 19, 1983

[54] UNDERCUTTER SEED PLANTER

[75] Inventor: Donald A. Suderman, Manhattan, Kans.

[73] Assignee: Kansas State University Research Foundation, Manhattan, Kans.

[21] Appl. No.: 225,469

[22] Filed: Jan. 16, 1981

[51] Int. Cl.³ .............................. A01C 5/06; A01C 7/20
[52] U.S. Cl. .......................................... 111/34; 111/80; 111/81; 111/85; 111/86
[58] Field of Search ................... 111/85, 84, 86, 83, 111/7, 81, 34, 80, 59, 73

[56] References Cited

U.S. PATENT DOCUMENTS

| 653,053 | 7/1900 | Zollner | 111/84 |
|---|---|---|---|
| 1,466,585 | 8/1923 | Hermance et al. | 111/83 |
| 2,509,627 | 5/1950 | Bickerton et al. | 111/7 |
| 3,895,589 | 7/1975 | Garner et al. | 111/85 |
| 4,257,340 | 3/1981 | Mickelsson et al. | 111/86 X |

FOREIGN PATENT DOCUMENTS

| 244384 | 10/1960 | Australia | 111/73 |
|---|---|---|---|
| 530673 | 9/1956 | Canada | 111/7 |
| 411765 | 6/1923 | Fed. Rep. of Germany | 111/86 |
| 2448965 | 4/1976 | Fed. Rep. of Germany | 111/7 |
| 843895 | 7/1939 | France | 111/7 |
| 1333998 | 6/1963 | France | 111/7 |
| 388691 | 11/1973 | U.S.S.R. | 111/6 |
| 660615 | 5/1979 | U.S.S.R. | 111/86 |

Primary Examiner—Steven A. Bratlie
Attorney, Agent, or Firm—Tilton, Fallon, Lungmus

[57] ABSTRACT

An undercutter seed planter in the form of an elongated tubular seed delivery member adapted to be pulled beneath the soil behind the blade of an undercutter plow. An air metering system supplies seeds to the seed delivery member and such seeds are released at preselected intervals beneath the soil surface from a discharge opening at the member's trailing end. The trailing end portion of the member is formed to create a V-shaped channel to receive the discharged seeds, and a gage wheel assembly connected to the member's trailing end rides upon the surface of the soil and maintains the seed discharge opening at a predetermined distance beneath that surface. A two-way hinge connects the leading end of the seed delivery member to the undercutter plow to permit vertical and horizontal movement of the member's trailing end with respect to the plow.

5 Claims, 8 Drawing Figures

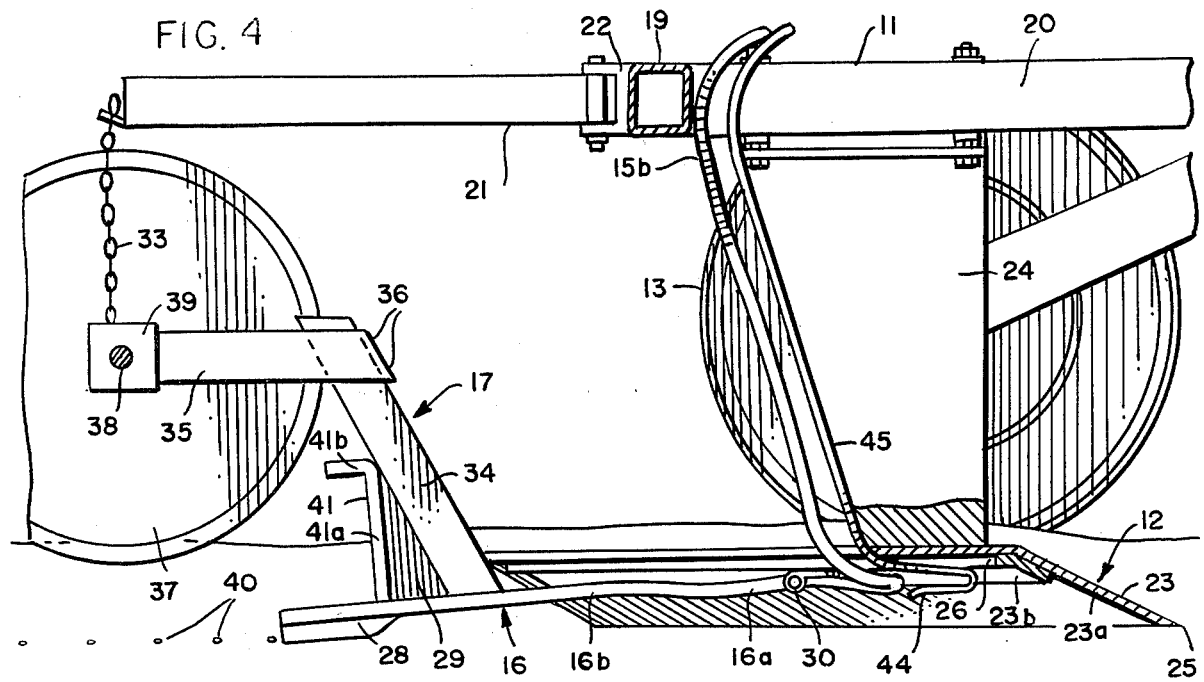
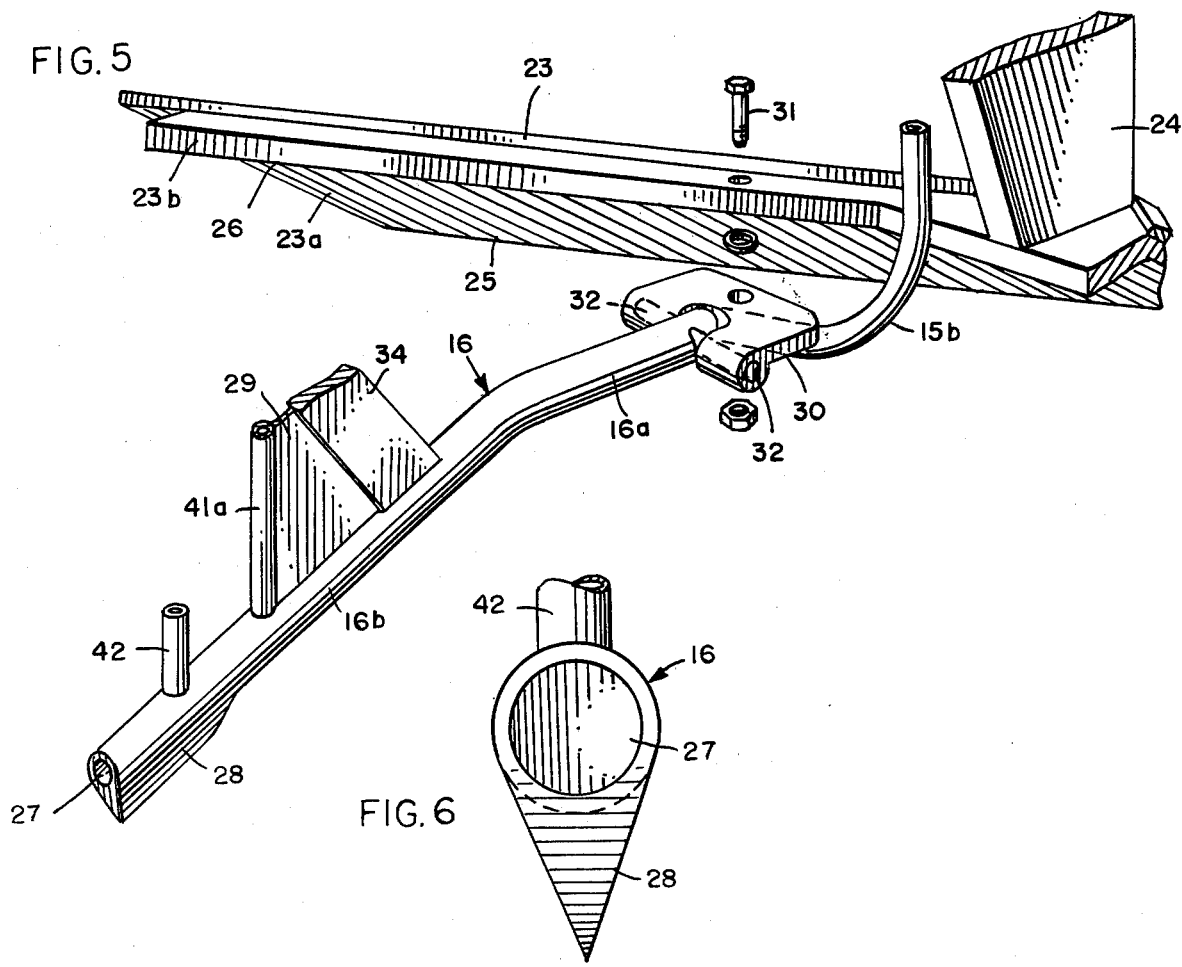

UNDERCUTTER SEED PLANTER

BACKGROUND AND SUMMARY

Conventional row-crop planters, whether designed for conventional tillage, minimum tillage, or no tillage, are commonly equipped with forming bars or openers which scrape along the surface of the soil to form an open trough for receiving seeds deposited by a suitable seed-metering mechanism. A coulter in the form of a fluted or rippled cutting wheel may be used to slice through trash and soil ahead of the opener so that the opener is better able to form a firm trench for receiving the seeds. One or more press wheels are also commonly provided to press the seed firmly into the soil, and usually to close the soil around the seed, for the purpose of obtaining better germination and emergence.

An object of this invention is to provide a planter which maximizes emergence with a minimum amount of tillage, thereby producing results superior to those of presently available minimum tillage planters while at the same time reducing energy consumption, erosion problems, and compaction problems. Another object is to provide a planter particularly suitable for use with an undercutter plow so that seeds are planted at prescribed intervals behind the plow without the formation of exposed trenches or furrows in the soil. A still further object is to provide a system in which seeds are delivered directly to their planting sites beneath the surface of the soil, immediately following, and as part of, an undercutter plowing operation. An additional object is to provide means for firming the soil along the lower portion of the tunnel or closed furrow, just prior to seed placement within that closed furrow, along with means for firming the soil above and to the side of each seed immediately after placement.

In brief, the apparatus takes the form of a downwardly and rearwardly sloping seed delivery member hingedly connected to the trailing portion of an undercutter blade and equipped with a gage wheel assembly that rides over the surface of the soil to support the free rear end of the seed delivery member at the desired sub-surface elevation, and also to press or firm the soil following seed application. An air metering system is provided to supply seeds to the tubular member at a predetermined frequency. The seeds are carried downwardly and rearwardly through the tubular rear portion of the member by a stream of air until the seeds approach the discharge opening at the member's trailing or distal end, at which point much of the air is vented and the seeds continue the remainder of the way by reason of momentum and residual air flow. Firming of the soil along the lower portion of the sub-surface tunnel or furrow is achieved because of the downward and rearward slope of the seed delivery member and because of the longitudinal keel or flange provided at its distal end. The gage wheel assembly is connected directly to the trailing distal end of the tubular member and rides upon the surface of the soil to perform the dual functions of maintaining the discharge opening at a selected depth beneath the surface and of firming the soil about the seeds immediately after they are planted.

At its proximal or forward end, the delivery tube or member is connected to a double-acting hinge which is in turn secured to the undercutter blade assembly. The hinge allows vertical movement of the member's trailing end relative to the undercutter blade, thereby permitting the seeds to be discharged at a depth controlled by the rear gage wheel assembly rather than by the depth of the undercutter blade spaced in front of that assembly. Horizontal movement of the member's trailing end is also permitted by the double hinge connection, thus insuring proper tracking when the planter is left in the ground while turning corners.

Auxiliary tubes may be provided at the trailing or distal end of the seed delivery member for injecting liquid or granular insecticides, fungicides, and the like into the tunnel-like furrow along with each seed discharged from the delivery tube. If desired, a fertilizer discharge tube may also be provided, preferably forward or to the side of the seed discharge opening of the seed delivery member, for supplying fertilizer to the soil around the seed bed as it is later formed by that member.

Other objects, features, and advantages will be apparent from the specification and drawings.

DRAWINGS

FIG. 4 is an enlarged sectional view illustrating the relationship between the undercutter blade assembly, seed delivery tube, and gage wheel assembly of the seed planting apparatus.

FIG. 5 is a fragmentary exploded perspective view illustrating the double hinge support for the seed delivery tube.

FIG. 6 is an enlarged distal end view of the seed delivery tube showing the depending keel or blade construction thereof.

DETAILED DESCRIPTION

Figure 1:
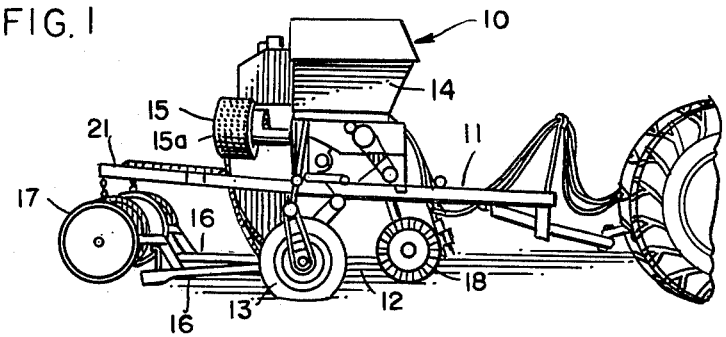
FIG. 1 is a side view of a complete planting apparatus embodying the present invention, such apparatus being hitched to a conventional tractor.
Figure 2:
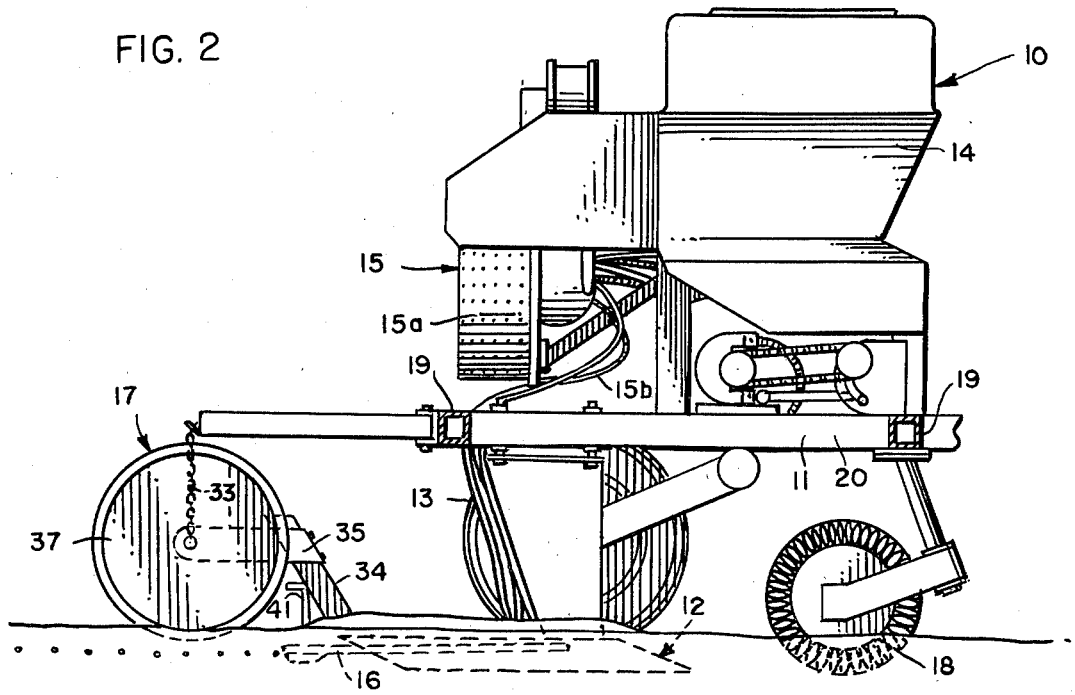
FIG. 2 is a side elevational view of the apparatus shown in FIG. 1, the undercutter blade and seed delivery tube of such apparatus being illustrated in dashed lines beneath the surface of the soil.

Referring to the drawings, and particularly to FIGS. 1 and 2, the numeral 10 generally designates an undercutter planter having a frame 11, an undercutter plow 12 suspended from the frame, vertically-adjustable gage wheels 13 alongside the plow which control the depth of the plow in use (FIG. 2) and also, when extended, support the apparatus for transfer to and from the place of operation (FIG. 1), a hopper 14 for supporting a quantity of seeds, an air metering mechanism 15 for metering seeds from the hopper into an air stream, tubular seed delivery members 16, and a pair of gage wheel assemblies 17 for supporting the trailing or distal ends of the seed delivery members 16 and for firming the soil on each side of the seeds discharged from such tubes. A coulter 18 may be mounted upon the frame in front of the undercutter plow 12 and in general alignment with each of the seed delivery members or tubes 16 to help cut and clear residue.

It is to be understood that certain of these elements are conventional and well known, although not in the particular combination described. Thus, the rippled coulter 18 is of a construction commonly used for the purpose of cutting debris to facilitate the operation of an opener used to form a V-shaped trough or furrow in the soil. The undercutter plow 12 is of the type marketed by Richardson Manufacturing Co., Inc., Cawker City, Kans. as a conservation tillage system, and the air distributing and seed metering system 15 may be of the type marketed by International Harvester Co., Chicago, Ill. under the designation Model 500 Cyclo planter. In such an air delivery system, seed from the hopper is automatically fed, under air pressure, to a rotating drum 15a equipped with perforated pockets. The seeds are temporarily held in place by air escaping outwardly through such perforations. As the pocketed seeds are carried to the top of their path of travel within the drum, release wheels block the escaping air, allowing the seeds to drop into delivery hoses or lines 15b. Air under relatively low pressure (about 5 to 8 psi) then carries the seeds through the lines to the points of application. While such an air delivery system has been found particularly effective in conjunction with, and as part of, the apparatus of the present invention, it is to be noted that other types of competitive air delivery systems are also commercially available and may be effectively used in the manner described herein. Since such air delivery systems, hoppers, coulters, and associated equipment, are all well known in the art, it is believed that description of their structure and operation in greater detail is unnecessary for purposes of this disclosure.

Figure 3:
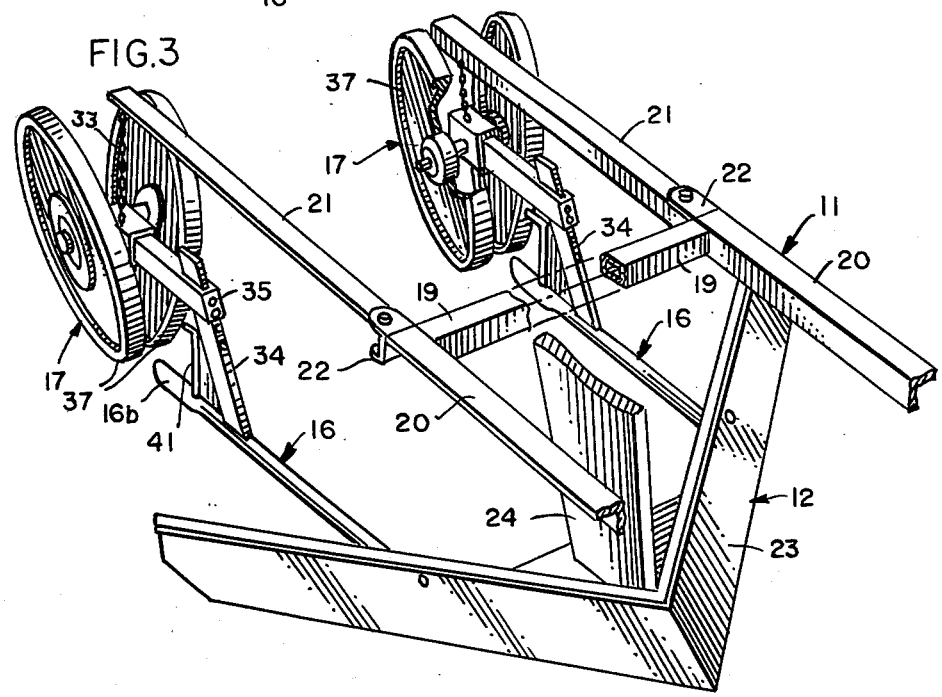
FIG. 3 is a perspective view illustrating the undercutter blade assembly, a pair of seed delivery tubes, and a pair of gage wheel assemblies connected to the distal ends of those tubes.

Frame 11 includes transverse and longitudinal horizontal frame members 19 and 20, respectively. Frame extensions 21 project rearwardly from the frame and are pivotally connected thereto by hinges 22, as illustrated most clearly in FIGS. 3 and 4. The hinged connections allow the free ends of the cantilevered frame extensions 21 to swing laterally, but not vertically, as the apparatus turns one way or the other during a planting operation, thereby allowing proper tracking action of the gage wheel and delivery tube assemblies 17 behind undercutter plow 12.

The undercutter plow 12 takes the form of a generally V-shaped undercutter blade 23 centrally supported by a vertical support column 25 which is bolted or otherwise secured at its upper end to frame 11. The lateral portions of the V-shaped blade extend outwardly and rearwardly in horizontal alignment with each other and are designed to travel beneath the surface of the soil as indicated in FIGS. 2 and 4 to perform an undercutting and moderate lifting operation without overturning the soil to any substantial extent. While referred to in this disclosure as a "blade" in the singular, such blade is actually an assembly of a tempered cutter plate 23a and an underlying support frame 23b, the two being secured together by bolts or by any other suitable connecting means. It will be observed that the blade, when viewed in side elevation or vertical section, slopes downwardly and forwardly at an angle less than about 30 degrees from the horizontal, and that its leading and trailing edges 25 and 26 are horizontally disposed when the gage wheels 13 of the apparatus rest upon a horizontal surface.

The undercutter plow as so far described is of standard construction. However, unlike a conventional undercutter plow, plow 12 provides the support for one or more trailing sub-surface seed delivery tubes 16. A pair of such tubes is shown in the drawings along with the supporting gage wheel assemblies 17 therefor; however, it is to be understood that a greater or smaller number might be provided depending upon the size of the equipment as a whole, the crop to be planted, and the desired distance between rows.

Each seed delivery tube 16 is of rigid construction and has a front or proximal end portion 16a hingedly connected to undercutter blade 23 and an enlongated rear or distal portion 16b sloping rearwardly and downwardly therefrom. A seed discharge opening 27 is provided at the rear end of the tube, and a flexible seed delivery hose 15b, leading from metering unit 15, communicates with the front end portion 16a of the tube. The front and rear portions of the delivery tube 16 are preferably circular in cross sectional outline throughout most of their longitudinal extent; however, at its distal end the rear portion has a downwardly and longitudinally extending keel or flange portion 28. As depicted most clearly in FIGS. 5 and 6, the flange portion 28 is V-shaped in outline.

A double-acting hinge 30 joins the front end of the tube to the underside of the undercutter blade adjacent the trailing edge 26 thereof. The hinge takes the form of a hinge plate apertured to receive a generally vertical bolt 31 which functions as a hinge pin to permit horizontal rotation of the plate with respect to the undercutter blade. In addition, the hinge plate 30 pivotally receives a pair of horizontal pins 32 secured to and projecting laterally from the delivery tube's front end portion 16a (FIG. 5) allowing vertical pivotal movement of the delivery tube in order to provide a controlled depth of planting.

The elevation of the seed delivery tube's trailing rear portion 16b during a planting operation is controlled by gage wheel assembly 17. That assembly includes a rearwardly and upwardly angled stanchion 34 secured at its lower end to tube 16 adjacent the rear end thereof. A wheel support member 35 projects rearwardly from the stanchion's upper end and is connected thereto by bolts 36 which, by the selection of threaded openings in the stanchion, allow incremental adjustability of the vertical position of member 35 and of the wheel or wheels supported thereby. In the illustrated embodiment, a pair of angled gage wheels or presswheels 37 are carried by axles 38 projecting laterally (and slightly downwardly) from mounting block 39 at the rear end of support member 35. Because of their angled mounting, the double gage wheels tend to produce a squeezing effect to firm the soil from the sides around seeds 40 released from delivery tube 16; however, for other types of crops it may be preferable to provide only a single gage wheel 37 at the end of each support 35. In any event, the rotational axis of each such wheel is spaced above and behind th outlet 27 of the seed delivery tube 16, and such gage wheel(s) perform the dual functions of firming the soil around planted seeds and of controlling the depth of discharge opening 27 and the seeds released therefrom.

An air release tube 41 projects upwardly from the rear end portion of the seed delivery tube 16 and is in direct communication with the passage of the delivery tube. The vertical portion 41a of the air release tube has a length sufficient to insure that the upper end of that tube extends above the surface of the soil during a planting operation. The air release tube also preferably includes a rearwardly turned portion 41b which directs air rearwardly and which reduces the likelihood of debris collecting in and clogging the air flow passage of that tube. To protect and brace the air release tube, that tube may be welded or otherwise secured at its upper end to stanchion 34. Gusset 29 may be welded or otherwise secured between the stanchion 34 and air release tube 41 to brace the respective elements and to prevent debris from accumulating therebetween.

Figure 7:
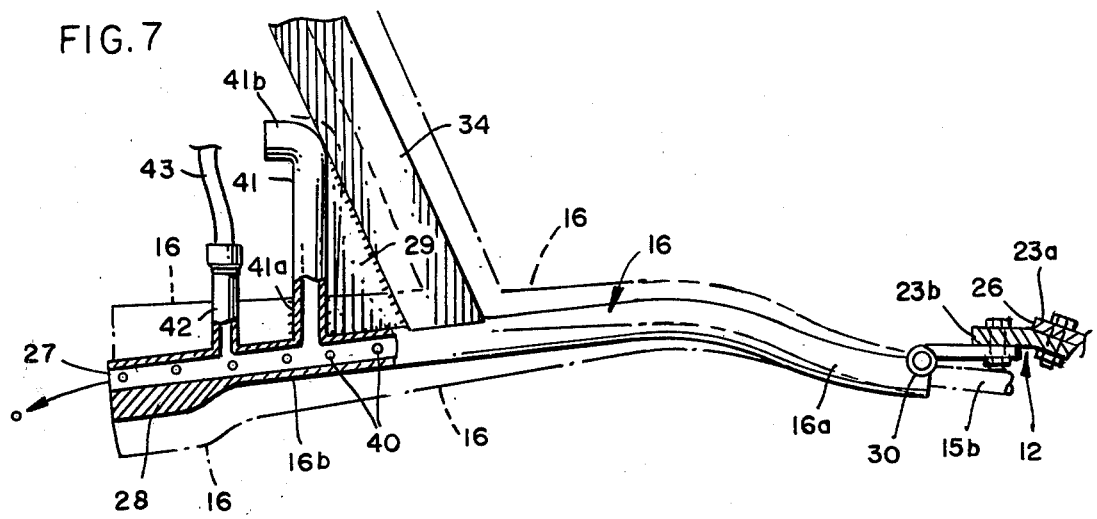
FIG. 7 is an enlarged elevational view illustrating the seed delivery tube and the hinged mounting therefor.

FIGS. 5-7 depict an optional additive tube 42 communicating with the seed delivery tube at a point behind (distal to) air release tube 41. Hose 43 leads from the additive tube to a tank or hopper (not shown) containing liquid or granulated insecticide, herbicide, or other additive in finely-divided solid form. Such additive may be metered into the soil along with seeds 40, the use of such additive being dependent largely on soil condition and the crop being planted.

In some instances, it may be desirable to introduce fertilizer into the soil during a planting operation. A fertilizer discharge tube 44 is shown in FIG. 4 in general alignment with, and in front of or to the side of seed delivery tube 16. Liquid or granular fertilizer may be metered from a suitable reservoir (not shown) and delivered to the discharge tube 44 by means of line 45.

In operation of the apparatus, each seed delivery tube 16 trails behind the sub-surface undercutter blade and tends to form a closed furrow or tunnel beneath the surface of the soil. The gradual downward slope of the rear portion of the delivery tube causes the soil beneath the tube to be firmed or compacted, and the V-shaped flange or keel portion 28 at the distal end of the tube reshapes the bottom of the furrow into a generally V configuration. While it is important that the trailing rear portion 16b of the delivery tube have an overall rearward and downward inclination in order to achieve such moderate compaction and V-groove formation, it has been found desirable to provide the front portion 16a with a downward and forward slope to insure that the rear portion 16b of the tube will assume the proper depth for seed discharge while maintaining the desired rearward and downward inclination of the major portion 16b. Such configuration permits soil broken and displaced by the undercutter blade to fall back around and beneath the delivery tube so that it may be more effectively firmed by the downwardly sloping stretch 16b.

Seeds 40 from the air metering mechanism 15 are carried in a stream of air into the front end of the seed delivery tube 16. The air stream transports the seeds rearwardly through the tube as generally depicted in FIG. 7. When the air stream reaches release tube 41, a major portion of the air is vented from the seed delivery tube, and the seeds continue to travel rearwardly through trailing portion 16b, and out through discharge opening 27, because of momentum and residual air flow. The released seeds fall into the V-shaped lower portion of the tunnel or closed furrow (along with whatever insecticide or other additive may have been supplied through additive tube 42), and the presswheels or gage wheels 37 immediately thereafter close the tunnel-like furrow about the seeds, primarily firming the soil on both sides of the seeds while permitting a looser condition of the soil directly above such seeds for ease of emergence.

Seed depth is controlled by the gage wheels which ride over the soil and insure that the discharge opening of the seed delivery tube will be maintained at a uniform depth beneath the soil surface regardless of limited variations in the elevation of undercutter gage wheels 13 and blade 23 resulting from soil surface irregularities. As indicated in broken lines in FIG. 7, such vertical movement, independent of variations in the elevation of the undercutter blade, is made possible by the hinged connection between the tube assembly and the undercutter blade.

During a planting operation, each seed delivery tube 16 is concealed from view beneath the surface of the soil. Stanchion 34 and air release tube 41 project upwardly through the surface but have little effect on the condition of the soil at the surface, at least partly because of coulter 18 which cuts into the soil and debris directly ahead of the seed delivery tube to provide a smooth parting line for passage of the stanchion and air release tube following therebehind.

Figure 8:
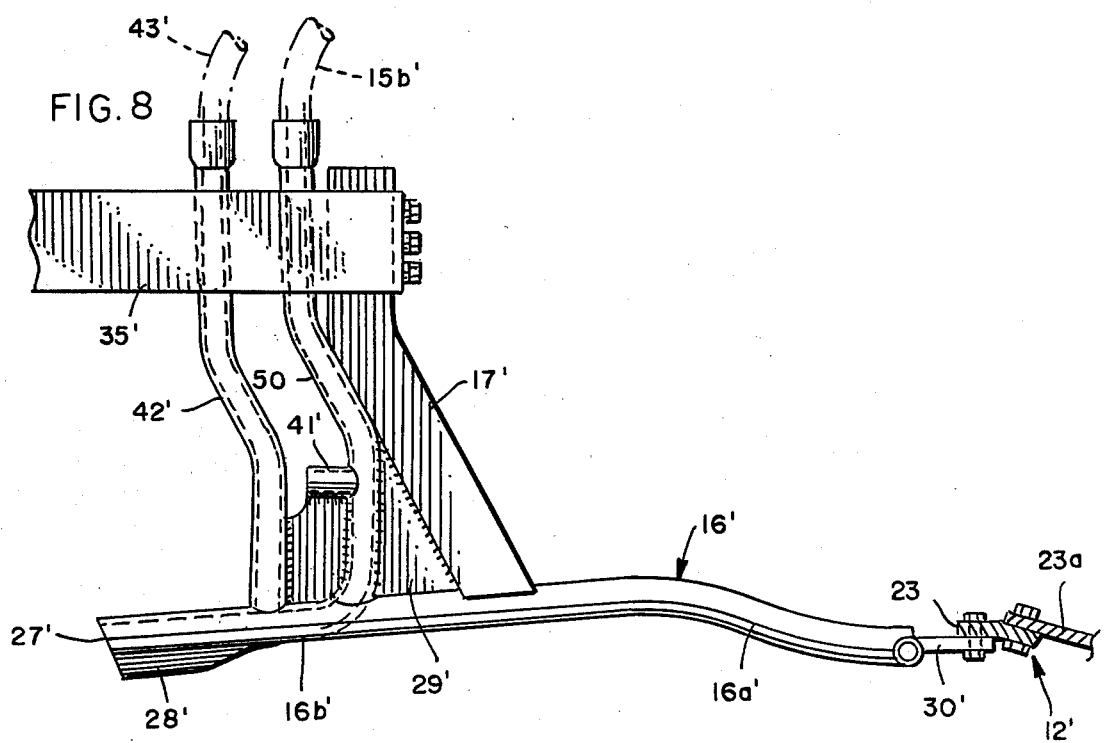
FIG. 8 is an enlarged elevational view similar to FIG. 7 but illustrating a modified embodiment of the invention.

The embodiment depicted in FIG. 8 is similar to the structure already described, the main difference being the point at which seeds and air enter the seed delivery member 16'. Although member 16' has the same general configuration as member 16 previously described, the front portion 16a' may be solid rather than tubular. Only the trailing rear portion 16b' must have a passage extending therethrough and, as shown in FIG. 8, that passage communicates at its forward end with an upstanding conduit 50 connected to seed delivery hose 15b'. An air release tube 41' vents air from the system just prior to discharge of the seeds from opening 27' at the distal end of member 16'. An optional additive tube 42' communicates with the tubular seed delivery member at a point between air release tube 41' and discharge opening 27'. Like the previously-disclosed structure, the tubular seed delivery member 16' is provided with a V-shaped keel or flange portion 28' at its distal end, has an elongated downwardly and rearwardly sloping rear trailing portion 16b40, a relatively short downwardly and forwardly sloping front portion 16a', and a hinged connection 30' which allows pivotal movement in both horizontal and vertical planes. In terms of function, the assembly depicted in FIG. 8 is similar to that shown in FIGS. 1-7.

While in the foregoing I have disclosed an embodiment of the invention in considerable detail for purposes of illustration, it will be understood by those skilled in the art that many of these details may be varied without departing from the spirit and scope of the invention.

I claim:

1. A seed planting apparatus comprising an undercutter plow having a blade with horizontal leading and trailing edges; transport means supporting said blade for substantially horizontal movement at a selected depth beneath a soil surface; an enlongated rigid seed delivery member connected to said blade and extending rearwardly from the trailing edge thereof for longitudinal movement beneath a soil surface behind said blade; said seed delivery member having a front portion and an elongated rear portion; said front portion being hingedly connected to said blade for horizontal and vertical movement of said rear portion with respect to said blade; said rear portion being tubular and rearwardly terminating in a trailing end having a seed discharge opening for releasing seeds into the soil beneath the surface thereof; said seed delivery member communicating with seed metering means adapted to supply seeds in a flowing air stream thereto for the release of seeds into the soil from said discharge opening; and a gage wheel assembly secured to said rear portion of said seed delivery member adjacent said trailing end; said gage wheel assembly including a stanchion secured to said seed delivery member adjacent said rear portion, a mounting member adjustably secured to said stanchion for movement into different selected positions of vertical adjustment therealong, and a pair of wheels rotatably mounted upon and disposed on opposite sides of said mounting member above and behind said trailing end of said seed delivery member; said seed delivery member being provided adjacent said trailing end with an upstanding air release tube for releasing air from said rear portion at a point spaced forwardly from said discharge opening; said air release tube having an outlet spaced above said seed delivery member a distance substantially greater than the depths of the soil at which said trailing end is adapted to be supported by said gage wheel assembly; said assembly being adapted to support said trailing end of said seed delivery member at a selected depth totally beneath the surface of the soil, with said seed delivery member forming a tunnel beneath the surface for receiving seeds from said discharge opening, when said apparatus is in operation; said trailing end of said seed delivery member having a depending longitudinal flange for firming the soil within said tunnel.

2. The apparatus of claim 1 in which said wheels of said pair extend along downwardly and inwardly converging planes.

3. The apparatus of claim 1 in which said flange is V-shaped in cross sectional outline.

4. The apparatus of claim 1 in which said rear portion of said seed delivery member slopes generally downwardly and rearwardly.

5. The apparatus of claim 1 in which said undercutter blade is generally V-shaped in configuration, said apparatus including a plurality of seed delivery members and gage wheel assemblies substantially identical to said first-mentioned seed delivery member and gage wheel assembly, the respective seed delivery members and gage wheel assemblies being spaced laterally apart in substantially parallel relation.

* * * * *